(12) United States Patent
Pfann et al.

(10) Patent No.: US 7,398,074 B2
(45) Date of Patent: Jul. 8, 2008

(54) INTEGRATED TRANSCEIVER CIRCUIT WITH LOW INTERFERENCE PRODUCTION AND SENSITIVITY

(75) Inventors: Peter Pfann, München (DE); Zdravko Boos, München (DE)

(73) Assignee: Infineon Technologies, Munich (DE)

( * ) Notice: Subject to any disclaimer, the term of this patent is extended or adjusted under 35 U.S.C. 154(b) by 449 days.

(21) Appl. No.: 10/822,544

(22) Filed: Apr. 12, 2004

(65) Prior Publication Data

US 2004/0229574 A1 Nov. 18, 2004

(30) Foreign Application Priority Data

Apr. 16, 2003 (DE) ............................... 103 17 598

(51) Int. Cl.
*H04B 1/16* (2006.01)
(52) U.S. Cl. .................. 455/318; 455/255; 455/118; 455/323
(58) Field of Classification Search ......... 455/255–265, 455/313, 318, 319, 323, 324, 325, 334, 333, 455/118, 127.4
See application file for complete search history.

(56) References Cited

U.S. PATENT DOCUMENTS

| 5,430,890 | A | * | 7/1995 | Vogt et al. ............... 455/180.3 |
| 5,822,366 | A | | 10/1998 | Rapeli |
| 5,953,641 | A | * | 9/1999 | Auvray ..................... 455/74 |
| 6,002,925 | A | * | 12/1999 | Vu et al. ..................... 455/313 |
| 6,125,266 | A | * | 9/2000 | Matero et al. ............... 455/126 |
| 6,415,001 | B1 | * | 7/2002 | Li et al. ...................... 375/259 |
| 6,424,826 | B1 | * | 7/2002 | Horton et al. ............... 455/255 |
| 6,675,003 | B1 | * | 1/2004 | Dubash et al. .............. 455/302 |
| 6,690,313 | B1 | * | 2/2004 | Warren et al. ............... 341/144 |
| 6,735,421 | B1 | * | 5/2004 | Claxton et al. .............. 455/207 |
| 6,738,602 | B1 | | 5/2004 | Heinen et al. |
| 6,804,308 | B1 | * | 10/2004 | Claxton et al. .............. 375/316 |
| 6,856,266 | B2 | * | 2/2005 | Clement et al. ............. 341/143 |
| 6,856,794 | B1 | * | 2/2005 | Tso et al. .................... 455/260 |
| 7,003,274 | B1 | * | 2/2006 | Olip .......................... 455/260 |
| 7,039,438 | B2 | * | 5/2006 | Khlat ....................... 455/552.1 |
| 7,103,343 | B2 | * | 9/2006 | Boos ......................... 455/316 |
| 2001/0014596 | A1 | * | 8/2001 | Takaki et al. ............... 455/324 |
| 2002/0039894 | A1 | * | 4/2002 | Yoshida et al. ............. 455/265 |
| 2003/0064699 | A1 | * | 4/2003 | Olsen ........................ 455/318 |
| 2003/0118135 | A1 | * | 6/2003 | Lee et al. .................... 375/354 |
| 2003/0171100 | A1 | * | 9/2003 | Petersson et al. ........... 455/141 |
| 2004/0137853 | A1 | * | 7/2004 | Tanaka et al. ................ 455/73 |
| 2005/0070325 | A1 | * | 3/2005 | Bellaouar et al. ........ 455/550.1 |

FOREIGN PATENT DOCUMENTS

| DE | 696 16 136 T2 | 10/1996 |
| DE | 198 05 963 A1 | 9/1999 |
| EP | 0 350 663 B1 | 1/1990 |

* cited by examiner

*Primary Examiner*—Blane J Jackson
(74) *Attorney, Agent, or Firm*—Eschweiler & Associates, LLC

(57) ABSTRACT

An integrated transceiver circuit has a reception path, which in turn has a mixer unit for demodulation of a received signal. An analog/digital converter unit is connected in the reception path downstream from the mixer unit. A first frequency divider is connected between the mixer unit and a voltage controlled oscillator in order to predetermine the demodulation frequency. A second frequency divider is connected between the oscillator and the analog/digital converter unit in order to predetermine the sampling frequency.

22 Claims, 2 Drawing Sheets

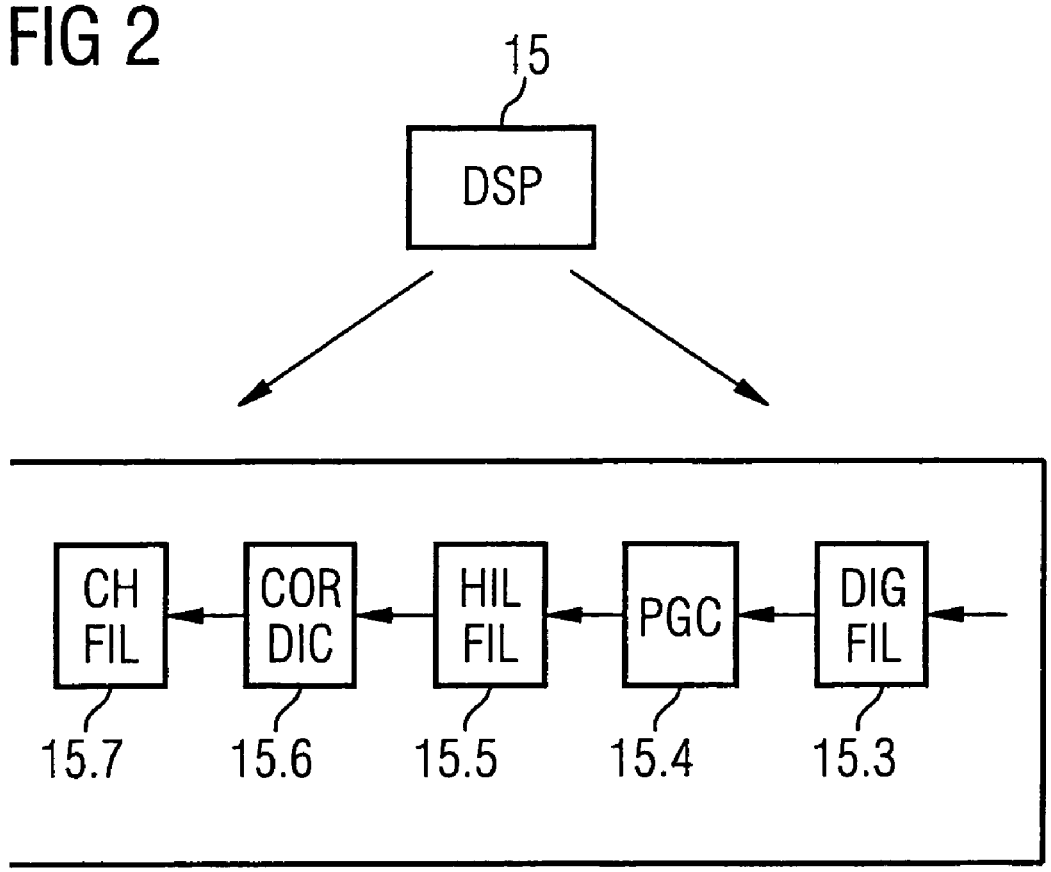

INTEGRATED TRANSCEIVER CIRCUIT WITH LOW INTERFERENCE PRODUCTION AND SENSITIVITY

FIELD OF THE INVENTION

The invention relates to an integrated transceiver circuit, which has an integrated receiver and, in addition, an integrated transmitter. A transmission signal can be transmitted and a received signal received at the same time via a duplexer and an antenna with the aid of the integrated transceiver circuit.

BACKGROUND OF THE INVENTION

Transceivers such as these are used, for example, in the filtered mobile radio. In this case, multimode transceivers in particular are also used, which have a high integration density and require and extraordinarily flexible transceiver concept in order to satisfy the requirements for low power consumption, a small area requirement and the different mobile radios. In this case, each mobile radio communication system predetermines its own clock frequencies for the integrated analog/digital converters and for the digital signal processing unit. Thus, for example, a mobile radio which is operated on the basis of the GSM Standard (Global System for Mobile Communications) predetermines a clock frequency of 13 MHz or a multiple of this. A mobile radio which operates on the basis of the UMTS Standard (Universal Mobile Telecommunications/Telephony System) in contrast requires a clock frequency of 3.84 MHz. A mobile radio system which operates on the basis of the CDMA 2000 Standard (Code Division Multiple Access) requires a clock frequency of 3.6864 MHz while, in contrast, the GPS (Global Positioning System) requires a clock frequency of 10.033 MHz. Finally, the DAB (Digital Audio Broadcast/Broadcasting) system requires a clock frequency of 8.192 MHz. These examples clearly illustrate that there is no integer relationship between these different clock frequencies. However, a multimode or multisystem transceiver must be designed such that it can be used for all communications standards and, in particular, for the standards mentioned above. This means that the individual functional blocks in the transceiver must be suitable for use in different mobile radio communications systems.

A further problem in the development of an integrated multimode transceiver circuit is that, in addition, the clock frequency must at the same time be sufficiently low but the multiples of the clock frequency, that is to say their harmonic frequencies, do not fall in the desired signal band of the receiver or in the intermediate frequency band. The harmonic frequencies of the clock frequency must also not appear in the signal spectrum of the transmission signal. Furthermore, the integrated transceiver circuit must be designed such that reception interference in the receiver path caused by the harmonic clock frequencies of the parasitic modulation of the voltage controlled oscillator (VCO) is outside the specified frequency bandwidth of the mobile radio system. On the other hand, however, the clock frequency should be high enough in order to allow increased oversampling for the analog/digital converters, which may be in the form of switched capacitor (SC) sigma delta converters or continuous time (CT) sigma delta converters.

Because some local oscillators and the clocks for the analog/digital and digital/analog converters are integrated on the transceiver chip, the frequencies and clock frequencies must be planned particularly carefully. This is necessary in particular in order to avoid undesirable interference in the desired RF or IF band, or in the base frequency band. Furthermore, the required signals must be derived from the main clock in a manner which allows the current that is drawn to be kept as small as possible, the chip area to be minimized, and a flexible solution to be offered.

Until now, the clock for the analog/digital converters has been obtained from the clock signal from a crystal oscillator or from the harmonic frequencies of the clock signal from the crystal oscillator, with the crystal oscillator being arranged outside the integrated circuit. As an alternative to this the problem has until now been solved by providing a separate frequency generator, comprising a voltage controlled oscillator and a phase locked loop, specifically for this purpose outside the integrated circuit.

A method and an appliance for production and processing of quadrature signals are specified in the document DE 696 16 136 T2. This document describes a transceiver with a receiver in which two oscillators are provided in order to produce local frequencies. A/D converters, which operate at a sampling frequency $f_s$, are connected via low-pass filters.

One object of the invention is to specify an integrated transceiver circuit which can be used for different clock frequencies, without interference from the harmonic frequencies produced by the clock frequencies.

SUMMARY OF THE INVENTION

In some embodiments of an integrated transceiver circuit according to the invention, a reception path includes a mixer unit for demodulation of the received signal and having an analog/digital converter unit, which is connected downstream from the mixer unit. The integrated transceiver circuit also has a first voltage controlled oscillator and a first frequency divider, with the frequency divider being connected between the first oscillator and the mixer unit in order to predetermine the demodulation frequency. Finally, a second frequency divider is also provided, which is connected between the first oscillator and the analog/digital converter unit, in order to predetermine the sampling frequency.

In some embodiments of the integrated transceiver circuit according to the invention, a transmission path is provided, with the transmission path having a modulator for modulation of a signal to be transmitted. Furthermore, a second voltage controlled oscillator and a third frequency divider are provided, with the third frequency divider being connected between the second oscillator and the modulator, in order to predetermine the modulation frequency. This means that the harmonics of the clock frequency are also outside the bandwidth of the useful signal in the transmission path.

In some embodiments, the transmission path has a digital/analog converter unit, which is connected upstream of the modulator. Furthermore, a fourth frequency divider is provided, which is connected between the second oscillator and the digital/analog converter unit, in order to predetermine its sampling frequency. The coupling of the digital/analog converter unit to the second voltage controlled oscillator that is provided in the integrated transceiver circuit makes it possible to achieve increased oversampling in a simple manner, without any additional interference occurring in the useful signal.

The described principle is not restricted to transmitting and receiving units, but may also be used for separate transmitting apparatuses and separate receiving apparatuses.

In some embodiments of the integrated transceiver circuit according to the invention, a reference frequency input is provided for application of an external reference frequency. Furthermore, a first phase locked loop is provided, which is connected between the reference frequency input and the first voltage controlled oscillator. This allows the high-precision but low reference frequency that is produced by an external crystal oscillator to be converted to a high and additionally precise internal reference frequency.

The integrated transceiver circuit advantageously has a second phase locked loop, which is connected between the reference frequency input and the second voltage controlled oscillator. This makes it possible to make use of the advantage mentioned above in the transmission path as well.

It is also advantageous for some embodiments of the integrated transceiver circuit according to the invention to have a low-pass filter unit, which is connected between the mixer unit and the analog/digital converter unit. The low-pass filter unit makes it possible to filter out from the signal that is produced by the mixer that signal component which represents the actual useful signal.

Furthermore, the integrated transceiver circuit can be provided with a second low-pass filter unit, which is connected between the digital/analog converter unit and the modulator.

In some embodiments, the mixer unit for the integrated transceiver circuit may be in the form of an IQ mixer.

The modulator of the integrated transceiver circuit may, according to some embodiments, be in the form of an IQ modulator.

In further embodiments of the invention, the reception path has a digital signal processing unit, which is connected downstream from the analog/digital converter unit, and with the output of the digital signal processing unit forming a digital reception path output.

According to further embodiments, the circuit can be even further improved by the reception path having a digital/analog converter unit which is connected downstream of the digital signal processing unit, and the output of the digital/analog converter unit forms an analog reception path output. A digital received signal or an analog received signal can thus be tapped off optionally at the outputs of the integrated transceiver circuit.

In some embodiments of the integrated transceiver circuit according to the invention, the analog/digital converter unit may have a first analog/digital converter and a second analog/digital converter, whose sampling control inputs are connected to the output of the second frequency divider. Particularly when using an IQ mixer, the in-phase signal component and the quadrature signal component can thus be converted synchronously from an analog signal to a digital signal.

In some embodiments of the integrated transceiver circuit according to the invention, the divisor values of the frequency dividers may be integer values. This has the advantage, inter alia, that their space requirement on the transceiver module is small and the current that they draw is low.

Exemplary embodiments of an integrated transceiver circuit according to the invention advantageously require extraordinarily little space. A further advantage is that the current that is drawn is minimal.

The proposed principle can be used not only for transceiver circuits but also for separate transmitting apparatuses as well as for separate receiving apparatuses.

BRIEF DESCRIPTION OF THE DRAWINGS

The invention will be explained in more detail in the following text using a number of exemplary embodiments and with reference to two figures, in which:

FIG. 2 shows the components of the digital signal processor for processing the digitized received signal in the form of a block diagram.

DETAILED DESCRIPTION

Figure 1:
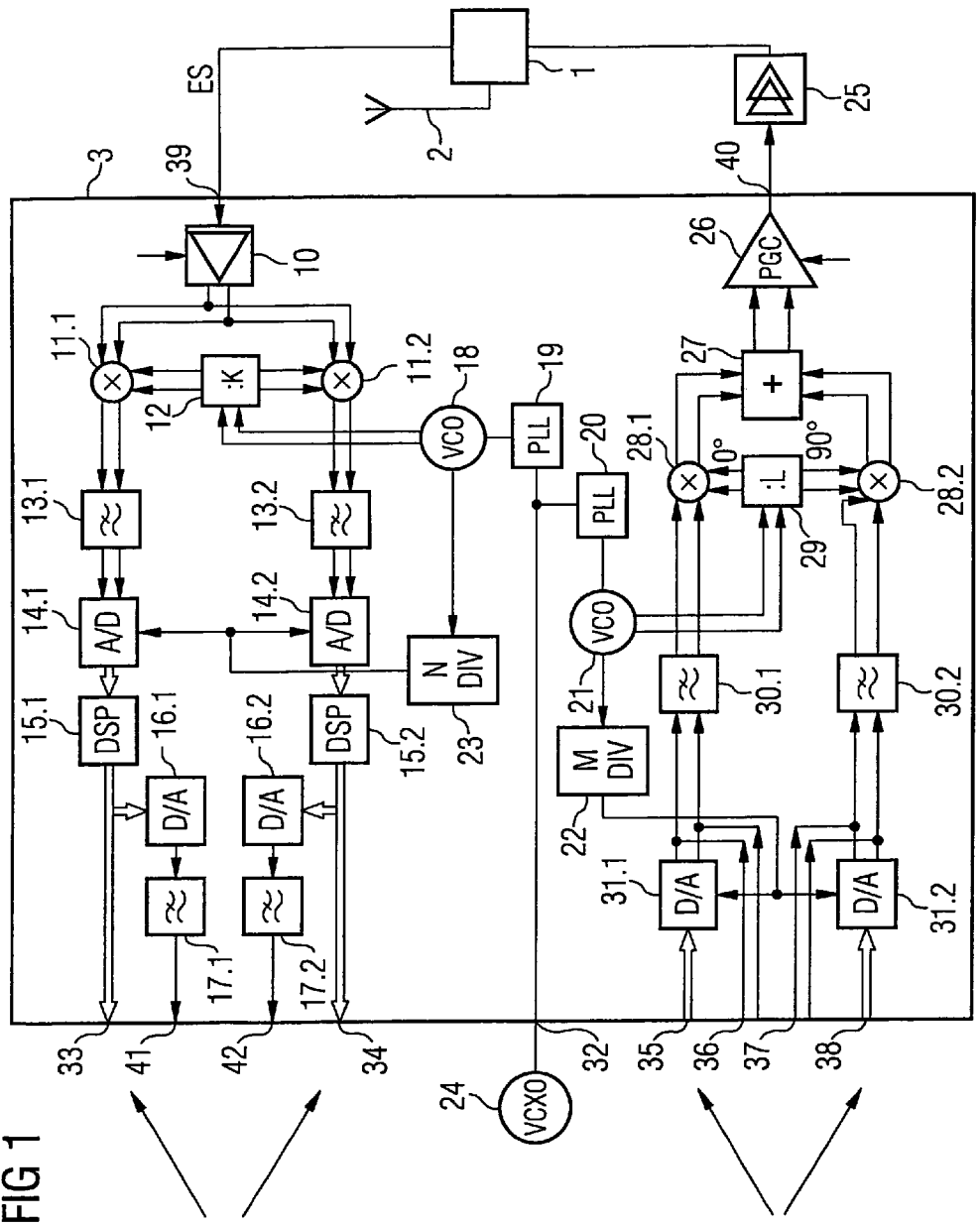
FIG. 1 shows exemplary embodiments of an integrated transceiver circuit according to the invention in the form of a block diagram.

Reference symbols in the drawings are:
1 Duplexer
2 Antenna
3 Transceiver module
10 Input amplifier
11.1 Mixer
11.2 Mixer
12 1/K divider
13.1 Low-pass filter
13.2 Low-pass filter
14.1 Analog/digital converter
14.2 Analog/digital converter
15 Digital signal processor
15.3 Digital filter
15.4 Variable gain amplifier
15.5 Hilbert filter
15.6 Digital mixer
15.7 Channel filter
16 Digital/analog converter
17 Low-pass filter
18 Voltage controlled oscillator
19 Phase locked loop
20 Phase locked loop
21 Voltage controlled oscillator
22 1/M divider
23 1/N divider
24 External oscillator
25 External amplifier
26 Transmission amplifier
27 Adder
28 Mixer
29 1/L divider
30 Low-pass filter
31 Digital/analog converter
32 Reference frequency input
33 Digital receiver output
34 Digital receiver output
35 Digital input
36 Analog input
37 Analog input
38 Digital input
39 Receiver input
40 Transmitter output
41 First analog receiver output
42 Second analog receiver output The block diagram in FIG. 1 shows the basic design of one possible embodiment of the integrated transceiver circuit according to the invention. The integrated transceiver circuit 3 has a reference frequency input 32, to which an external crystal oscillator 24 is connected. A reference signal is produced via the external crystal oscillator 24 and a reference frequency which has good frequency stability. The reference frequency input 32 is connected to the input of a first phase locked loop (PLL) 19, and to the input of a second phase locked loop 20. In conjunction with a local oscillator 18 which is in the form of a voltage controlled oscillator (VCO), the first phase locked loop 19 produces an extraordinarily stable first internal clock frequency. The clock frequency which is produced by the voltage controlled oscillator 18 is passed to the two inputs of an IQ mixer 11.1 and 11.2 via a first frequency divider 12, which divides the clock frequency by the factor K. The factor K is a value which is taken from the set of natural numbers. A received signal ES which is applied to the receiver input 39 of the integrated transceiver circuit 3, and has been received by an antenna 2 and passed by a duplexer 1 to the receiver input 39, is amplified via a reception amplifier 10 and is passed to the two mixer inputs of the IQ mixer 11.1 and 11.2. The amplified received signal ES is mixed with the aid of the IQ mixer 11.1, 11.2 with the internal clock signal divided by the factor K, and is passed via a first low-pass filter 13.1 and a second low-pass filter 13.2, respectively, to the inputs of an analog/digital converter unit 14.1 and 14.2. The analog/digital converter unit has two analog/digital converters 14.1 and 14.2, whose control inputs for the sampling signal are connected to a second frequency divider 23, with the second frequency divider 23 dividing the internal reference frequency that is produced by the voltage controlled oscillator 18 by the divisor value N, which is likewise an integer value. The down-mixed digital received signals which are produced at the outputs of the two analog/digital converters 14.1 and 14.2 are passed to a digital signal processing unit 15, comprising the two signal processing blocks 15.1 and 15.2. The in-phase component and the quadrature signal component of the received signal are processed further with the aid of the digital signal processor 15 in the steps shown in FIG. 2 and are then available as digital received signal components at the two digital receiver outputs 33 and 34 of the integrated transceiver circuit 3. The reception path through the transceiver circuit 3 also has two digital/analog converters 16.1 and 16.2, which are connected downstream from the digital signal processor 15 and, together with two low-pass filters 17.1 and 17.2, use the digital received signal components to form an analog received signal, comprising an in-phase component and a quadrature component. The two analog signal components can be tapped off at the two analog output connections 41 and 42.

When the transceiver is used in a CDMA system by way of example, the voltage controlled oscillator 18 can produce a clock signal at a frequency of 4 GHz, which is then divided down by the 1:K frequency divider 12 and the 1:N frequency divider 23 to the required frequencies. For example, the sampling frequency for the analog/digital converters 14.1 and 14.2 can thus be fixed at 400 MHz. The divisor value N thus then has the value 10.

The transmission path through the integrated transceiver module 3 has two digital inputs 35 and 38, via which two digital/analog converters 31.1 and 31.2 produce an analog transmission signal from a digital transmission signal that is in baseband. This analog transmission signal is passed via two low-pass filters 30.1 and 30.2 to the inputs of two mixers 28.1 and 28.2 of a modulator 28.1, 28.2, 27. The internal clock signal which is produced by the local oscillator 21 in conjunction with the phase locked loop 20 is divided by a 1:L frequency divider 29 and is passed to the two further inputs of the two mixers 28.1 and 28.2. The 1:L frequency divider divides the frequency by an integer value L. The in-phase signal component which is produced by the mixer 28.1 and does not have any phase shift is added with the aid of an adder 27 to the quadrature signal component that is produced by the mixer 28.2 and has a 90° phase shift, and is passed to an internal variable gain amplifier 26. The amplified transmission signal can then be tapped off at the transmission signal output 40 of the integrated transceiver module 3. It can then be passed by an external amplifier 25 to the antenna 2, in an additionally amplified form, with the aid of the duplexer 1.

FIG. 2 shows the individual signal processing steps in the digital signal processor 15, subdivided into individual functional blocks. The digital received signal which is applied to the input of the digital signal processor 15 is first of all filtered with the aid of a digital filter 15.3, in order to subsequently be amplified with the aid of a variable gain amplifier (PGC) 15.4. In a next step, the signal is filtered with the aid of a Hilbert filter 15.5, with the negative frequencies in this case being attenuated and the positive frequencies being passed through. The signal that has been filtered in this way is then mixed with high precision via a digital mixer (COR DIC) 15.6 and, finally, is filtered once again via a channel filter 15.7, in order then to make it possible to tap this off as a digital received signal at the connections 33 and 34. The frequency of the signal which is produced by the second local oscillator 21 is divided with the aid of the 1:M frequency divider 22 by an integer value M, and is passed to the control inputs for the sampling signal of the two digital/analog converters 31.1 and 31.2.

Since the sampling frequencies for the two analog/digital converters 14.1 and 14.2 are obtained from the frequency of the local oscillator 18 by dividing its frequency by an integer divisor value N, this means that the frequency of the local oscillator 18 satisfies an integer relationship with the sampling frequency of the analog/digital converter unit 14.1, 14.2 for each frequency channel and for each communication system. The harmonic frequency components in the sampling signal for the analog/digital converter unit 14.1, 14.2 thus never occur in the band region of the received signal. The same is also true in the same sense for the ratio between the frequency produced by the second local oscillator 21 and the sampling frequency for the two digital/analog converters 31.1 and 31.2. In this case as well, the harmonic frequencies of the sampling signals for the digital/analog converters 31.1 and 31.2 never fall in the frequency range of the useful signal. This means that the sampling signals and their harmonic frequencies are synchronized to the transmission signal. The requirements for masking of the transmission signal spectrum and for the transmitter interference responses can thus be satisfied more easily.

The integrated transceiver circuit allows the oscillator frequency for the external oscillator 24 for the two phase locked loops 19 and 20 to be chosen to be sufficiently low that the harmonic frequencies cannot occur in the desired reception channel. A further advantage means that the sampling frequencies for the analog/digital converters 14.1 and 14.2 and those for the digital/analog converters 31.1 and 31.2 can be chosen to be sufficiently high to allow a sufficiently high degree of oversampling. In addition, the sampling frequency for the analog/digital converters 14.1, 14.2 shifts the receiver interference response out of the frequency band of the mobile radio system, owing to the parasitic receiver VCO modulation. Furthermore, the high sampling frequency for the digital/analog converters 31.1 and 31.2 shifts the transmitter interference response out of the frequency band of the mobile radio system owing to the parasitic transmitter VCO modulation. A further advantage is justified by the fact that the chip area and the power consumption can be reduced, because the frequency dividers 12, 23, 22 and 29 draw only a small amount of current and occupy a small chip area when they are implemented, for example, in a sub-micron CMOS configuration. Furthermore, the phase noise in the reception path is small, and the signal jitter in the voltage controlled oscillator 21 in the transmission path is likewise very low.

If it should be found to be a disturbing factor that the sampling frequency for the analog/digital converters 14.1 and 14.2 does not have an integer relationship with the chip clock rate, for example in a CDMA system, this problem may be solved in the following two ways. One possibility is to provide a sampling rate converter in a system with a low bit rate, for example GSM. A second possibility is to convert the digitized received signal back to an analog received signal, to be precise with the aid of the two digital/analog converters 16.1 and 16.2. Two reconstruction filters 17.1 and 17.2 are then also provided and are connected downstream from the two digital/analog converters 16.1 and 16.2 in order to smooth the received signal, which has once again been converted to an analog signal. The number of bits as well as the Nyquist clock frequency are also considerably lower in this case.

The transmitter/receiver module, for example for a GSM, UMTS, CDMA, GPS and DAB system can be produced with the aid of the integrated transceiver circuit according to the invention. The integrated transceiver circuit according to the invention advantageously produces very little interference and is very insensitive to interference, with the power consumption of the chip area being minimized at the same time.

The above description of the exemplary embodiments according to the present invention is intended only for illustrative purposes and not for the purpose of restricting the invention. Various changes and modifications are possible within the scope of the invention without departing from the scope of the invention and its equivalents.

What is claimed:

1. An integrated transceiver circuit, comprising:
   a reception path comprising:
      a mixer unit configured to demodulate a received signal;
      an analog/digital converter unit connected downstream from the mixer unit;
      a first voltage controlled oscillator;
      a first frequency divider connected between the first voltage controlled oscillator and the mixer unit, and configured to obtain a demodulation frequency for use by the mixer unit; and
      a second frequency divider connected between the first voltage controlled oscillator and the analog/digital converter unit, and configured to obtain a sampling frequency for use by the analog/digital converter unit; and
   a transmission rath comprising:
      a modulator configured to modulate a signal to be transmitted;
      a second voltage controlled oscillator;
      a third frequency divider connected between the second voltage controlled oscillator and the modulator, and configured to obtain a modulation frequency for use by the modulator;
      a digital/analog converter unit connected upstream of the modulator; and
      a fourth frequency divider connected between the second voltage controlled oscillator and the digital/analog converter unit, and configured to obtain a sampling frequency for use by the digital/analog converter unit.

2. The integrated transceiver circuit of claim 1, including a reference frequency input for receiving an external reference frequency, and a first phase locked loop connected between the reference frequency input and the first voltage controlled oscillator.

3. The integrated transceiver circuit of claim 2, including a second phase locked loop connected between the reference frequency input and the second voltage controlled oscillator.

4. The integrated transceiver circuit of claim 3, wherein the reception path includes a digital signal processing unit connected downstream from the analog/digital converter unit, the digital signal processing unit having an output which forms a digital output of the reception path.

5. The integrated transceiver circuit of claim 4, wherein the reception path includes a digital/analog converter unit coupled to the output of the digital signal processing unit, the digital/analog converter unit having an output which forms an analog output of the reception path.

6. The integrated transceiver circuit of claim 4, wherein the reception path includes a digital signal processing unit connected downstream from the analog/digital converter unit, the digital signal processing unit having an output which forms a digital output of the reception path.

7. The integrated transceiver circuit of claim 6, wherein the reception path includes a digital/analog converter unit coupled to the output of the digital signal processing unit, the digital/analog converter unit having an output which forms an analog output of the reception path.

8. The integrated transceiver circuit of claim 1, wherein the reception path includes a digital signal processing unit connected downstream from the analog/digital converter unit, the digital signal processing unit having an output which forms a digital output of the reception path.

9. The integrated transceiver circuit of claim 8, wherein the reception path includes a digital/analog converter unit coupled to the output of the digital signal processing unit, the digital/analog converter unit having an output which forms an analog output of the reception path.

10. The integrated transceiver circuit of claim 1, including a reference frequency input for receiving an external reference frequency, and a phase locked loop connected between the reference frequency input and the second voltage controlled oscillator.

11. The integrated transceiver circuit of claim 1, wherein the transmission path includes a low-pass filter unit connected between the digital/analog converter unit and the modulator.

12. The integrated transceiver circuit of claim 1, wherein the reception path includes a digital signal processing unit connected downstream from the analog/digital converter unit, the digital signal processing unit having an output which forms an digital output of the reception path.

13. The integrated transceiver circuit of claim 12, wherein the reception path includes a digital/analog converter unit coupled to the output of the digital signal processing unit, the digital/analog converter unit having an output which forms an analog output of the reception path.

14. The integrated transceiver circuit of claim 1, including a reference frequency input for receiving an external reference frequency, and a phase locked loop connected between the reference frequency input and the second voltage controlled oscillator.

15. The integrated transceiver circuit of claim 14, including a further phase locked loop connected between the reference frequency input and the first voltage controlled oscillator.

16. The integrated transceiver circuit of claim 1, including a reference frequency input for receiving an external reference frequency, and a phase locked loop connected between the reference frequency input and the first voltage controlled oscillator.

17. The integrated transceiver circuit of claim 1, wherein the modulator is an IQ modulator.

18. The integrated transceiver circuit of claim 1, wherein the analog/digital converter unit includes first and second analog/digital converters having respective sampling control inputs which are connected to an output of the second frequency divider.

19. The integrated transceiver circuit of claim 1, wherein the reception path includes a low-pass filter unit connected between the mixer unit and the analog/digital converter unit.

20. The integrated transceiver circuit of claim 1, wherein the mixer unit is an IQ mixer.

21. The integrated transceiver circuit of claim 1, wherein the first and second frequency dividers are integer dividers.

22. A method for processing a signal, comprising:

obtaining a demodulation frequency for use by a mixer unit in a reception path of an integrated transceiver circuit with a first frequency divider connected between a first voltage controlled oscillator and the mixer unit;

demodulating a received signal with the mixer unit and the obtained demodulation frequency;

obtaining a sampling frequency for use by an analog to digital converter unit with a second frequency divider connected between the first voltage controlled oscillator and the analog to digital converter unit;

performing a digitizing operation on the demodulated received signal with the analog to digital converter and the obtained sampling frequency;

obtaining a modulation frequency for use by a modulator in a transmission path of the integrated transceiver circuit with a third frequency divider connected between a second voltage controlled oscillator and the modulator;

modulating a signal to be transmitted with the modulator and the obtained modulation frequency;

obtaining a sampling frequency for use by a digital to analog converter unit with a fourth frequency divider connected between the second voltage controlled oscillator and the digital to analog converter unit; and performing a de-digitizing oreration on the modulated received signal with the digital to analog converter and the obtained sampling frequency.

* * * * *

UNITED STATES PATENT AND TRADEMARK OFFICE
CERTIFICATE OF CORRECTION

| | | |
|---|---|---|
| PATENT NO. | : 7,398,074 B2 | Page 1 of 1 |
| APPLICATION NO. | : 10/822544 | |
| DATED | : July 8, 2008 | |
| INVENTOR(S) | : Peter Pfann and Zdravko Boos | |

It is certified that error appears in the above-identified patent and that said Letters Patent is hereby corrected as shown below:

Column 4, line 59: Please delete the number "20" at the end of the line.

Column 7, line 40: Please replace the word "rath" with the word --path--.

Column 8, line 6, claim 6: Please replace the number "4" with the number --2--.

Column 8, line 38: Please replace the word "an" with the word --a--.

Signed and Sealed this

Twenty-first Day of October, 2008

JON W. DUDAS
*Director of the United States Patent and Trademark Office*